(12) United States Patent
Fukumoto (10) Patent No.: US 9,273,384 B2
(45) Date of Patent: Mar. 1, 2016

(54) HIGH SPEED TOOL STEEL, MATERIAL FOR BLADE EDGE, CUTTING TOOL, AND MANUFACTURING METHOD OF MATERIAL FOR BLADE EDGE

(71) Applicant: HITACHI METALS, LTD., Tokyo (JP)

(72) Inventor: Shiho Fukumoto, Shimane (JP)

(73) Assignee: HITACHI METALS, LTD., Tokyo (JP)

( * ) Notice: Subject to any disclaimer, the term of this patent is extended or adjusted under 35 U.S.C. 154(b) by 352 days.

(21) Appl. No.: 14/031,285

(22) Filed: Sep. 19, 2013

(65) Prior Publication Data

US 2014/0079585 A1    Mar. 20, 2014

(30) Foreign Application Priority Data

Sep. 20, 2012  (JP) ................................. 2012-206562
Mar. 26, 2013  (JP) ................................. 2013-063778

(51) Int. Cl.
| | |
|---|---|
| *C22C 38/22* | (2006.01) |
| *C22C 38/24* | (2006.01) |
| *C21D 8/02* | (2006.01) |
| *C21D 9/18* | (2006.01) |
| *C22C 38/30* | (2006.01) |
| *B26D 1/00* | (2006.01) |
| *C22C 38/04* | (2006.01) |
| *C22C 38/02* | (2006.01) |
| *C22C 38/00* | (2006.01) |
| *B23D 61/12* | (2006.01) |
| *B23D 65/00* | (2006.01) |
| *C21D 6/00* | (2006.01) |
| *C21D 1/25* | (2006.01) |
| *C21D 9/22* | (2006.01) |

(52) U.S. Cl.
CPC .............. *C22C 38/30* (2013.01); *B23D 61/127* (2013.01); *B23D 65/00* (2013.01); *B26D 1/0006* (2013.01); *C21D 1/25* (2013.01); *C21D 6/002* (2013.01); *C22C 38/001* (2013.01); *C22C 38/002* (2013.01); *C22C 38/02* (2013.01); *C22C 38/04* (2013.01); *C22C 38/22* (2013.01); *C22C 38/24* (2013.01); *C21D 9/22* (2013.01); *C21D 2211/004* (2013.01)

(58) Field of Classification Search
None
See application file for complete search history.

(56) References Cited

FOREIGN PATENT DOCUMENTS

| | | |
|---|---|---|
| JP | H08-158017 A | 6/1996 |
| JP | H09-3604 A | 1/1997 |
| JP | 2010-280022 A | 12/2010 |

OTHER PUBLICATIONS

Chinese Office action issued with respect to application No. 201310432092.6, mail date is May 11, 2015.

*Primary Examiner* — Deborah Yee
(74) *Attorney, Agent, or Firm* — Greenblum & Bernstein, P.L.C.

(57) ABSTRACT

A high speed tool steel containing, by mass percent, 0.5-1.5% of C; 1.0% or less of Si; 1.0% or less of Mn; 3.0-5.0% of Cr; 15.0-25.0% of one or two kinds of W and Mo according to a formula (W+2Mo); 1.0-less than 1.5% of V; 5.0-10.0% of Co; and a remainder including Fe and impurities, the high speed tool steel further containing 0.0005-0.004% of Ca and 0.005-0.015% of N. Also, a material for a blade edge that is made of the high speed tool steel and a cutting tool made by welding the material for the blade edge to a body material. Further, a manufacturing method of the material for the blade edge.

6 Claims, 6 Drawing Sheets

Fig. 1

Fig. 2  Steel Ingot No. 2

Fig. 3

Steel Ingot No. 3

Fig. 4     Steel Ingot No. 9

Fig. 5

HIGH SPEED TOOL STEEL, MATERIAL FOR BLADE EDGE, CUTTING TOOL, AND MANUFACTURING METHOD OF MATERIAL FOR BLADE EDGE

CROSS-REFERENCE TO RELATED APPLICATIONS

The present application claims priority under 35 U.S.C. §119 of Japanese Application No. 2012-206562, filed on Sep. 20, 2012, and of Japanese Application No. 2013-063778, filed on Mar. 26, 2013, the disclosures of which are expressly incorporated by reference herein in their entirety.

BACKGROUND OF THE INVENTION

1. Field of the Invention

The present invention relates to a high speed tool steel, a material for a blade edge, a cutting tool, and a manufacturing method of the material for the blade edge, the high speed tool steel being suitable as a source material for the material for the blade edge of the cutting tool such as a saw blade used in cutting a metal.

2. Description of Related Art

Conventionally, in cutting a metallic material such as steel, a cutting tool is used, a typical example of which is a saw blade such as a band saw and a circular saw. The saw blade is manufactured in general by the following process. First, a source material such as a steel ingot or billet is prepared by casting a molten steel adjusted to a predetermined component composition, or a source material is prepared by hot pressure molding a powder obtained from the molten steel using an atomizing method, and the source material is subjected to hot working. Thereafter, various machining processes and heat treatments are performed and a material for a blade edge having a flat wire shape and the like is manufactured. Next, the material for the blade edge is welded to a body material by electron beam welding or laser welding or the like; the resulting product is subjected to sharpening, then quenching and tempering, and is finished to a saw blade as a final product. As the source material for the above material for the blade edge, a high speed tool steel SKH59 specified in JIS G 4403 (corresponding to HS2-9-1-8 specified in ISO4957) is widely used. SKH59 has excellent red hardness and is a source material with excellent cutting durability, and has excellent characteristics as the source material for the material for the blade edge of the saw blade. For example, Japanese Patent Laid-Open Publication No. 2010-280022 discloses an invention of a band saw blade and a manufacturing method thereof in which SKH59 is adopted as a source material for a material for a blade edge.

Since a saw blade having a blade edge manufactured using SKH59 has excellent cutting durability, the saw blade is used in cutting various steels. However, it is known that, depending on a condition of use, early wear, chipping and the like of the blade edge can occur as forms of wear and breakage limited to the blade edge. As a countermeasure against these forms of wear and breakage, improvements in the design of the blade edge, such as a shape, hardness and surface treatment of the blade edge, have been carried out. However, chipping can still occur at an early stage. Other than matters related to the design of the blade edge, one of the reasons for the above chipping to occur is that coarse carbides are contained in a structure of the material for the blade edge. That is, when a large amount of significantly coarse carbides are contained in the structure of the material for the blade edge (for example, when a large amount of carbides having an absolute maximum length of 25 μm or more are contained in a cross-sectional structure), these significantly coarse carbides remain in the structure of the blade edge even after quenching and tempering, and toughness of the blade edge decreases. A stress (fracture stress) required to break the blade edge during use decreases, and fracture originating from a coarse carbide occurs. Therefore, reducing the size of the carbides in the structure of the material for the blade edge is effective in inhibiting chipping.

The component composition of SKH59 that allows a high degree of hardness to be realized is an alloy design in which a large amount of carbides are formed in a structure. In a case of a high speed tool steel having such a component composition, when a source material such as a steel ingot or billet is formed, significantly coarsened massive eutectic carbides are likely to be formed in a cast structure of the source material. In general, the eutectic carbides ($M_2C$) in the cast structure have plate-like shapes, and can be changed to granular carbides ($M_6C$) by hot working. However, when the eutectic carbides are in a significantly coarse massive form, in a manufacturing process of the material for the blade edge, even by successive hot working (wire rod processing), the carbides cannot be changed to be sufficiently granular, so that, in an annealed structure of the material for the blade edge, there is a large amount of the significantly coarse carbides having an absolute maximum length of 25 μm or more. The carbides that cannot be finely formed in the annealed structure do not become fine even after welding and sharpening, nor in the quenching and tempering of a final process. As a result, this becomes a main reason why a saw blade containing a large amount of coarse carbides in a blade edge structure has excellent wear resistance, but chipping resistance of the saw blade deteriorates.

However, for the material for the blade edge according to the conventional technology, reducing the size of the carbides in a structure is not necessarily easy. The reason is that, in order to achieve efficiency in an actual operation, it is necessary to increase a weight of the source material such as steel ingots or billets so that a cooling rate slows down when molten steel solidifies, and thus undesirable coarse eutectic carbides are formed in a cast structure of the source material after solidification and remain until a subsequent process. A purpose of the present invention is to provide a high speed tool steel that maintains excellent characteristics of SKH59 and for which carbides can be finely formed in a solidified structure even at an actual operation level, and to provide a material for a blade edge that is made using the high speed tool steel, and a cutting tool. Another purpose of the present invention is to provide a manufacturing method of the material for the blade edge.

SUMMARY OF THE INVENTION

In order to solve the above problem, the inventor of the present invention re-examined in detail the component composition of SKH59. As a result, the inventor has found that, by allowing the component composition of SKH59 to contain specific elemental species in optimal ranges, without substantially changing the component composition of SKH59, the excellent characteristics of SKH59 can be maintained and eutectic carbides in a cast structure can be finely formed. And thus, by specifically determining component ranges of Ca and N that are the specific elemental species, the inventor reached the present invention.

That is, one aspect of the present invention is a high speed tool steel containing, by mass percent, 0.5-1.5% of C; 1.0% or less of Si; 1.0% or less of Mn; 3.0-5.0% of Cr; 15.0-25.0% of one or two kinds of W and Mo according to a formula (W+2Mo); 1.0-less than 1.5% of V; 5.0-10.0% of Co; and a remainder including Fe and impurities. The high speed tool steel further contains 0.0005-0.004% of Ca; and 0.005-0.015% of N. Another aspect of the present invention is a material for a blade edge that is made of the above high speed tool steel. It is preferable that an absolute maximum length of a carbide contained in a cross-sectional structure of the above material for the blade edge is less than 25 μm. Another aspect of the present invention is a cutting tool that is made by welding the above material for the blade edge to a body material.

Another aspect of the present invention is a manufacturing method of a material for a blade edge. The method includes casting a high speed tool steel as a steel ingot and hot working the steel ingot. The high speed tool steel contains, by mass percent, 0.5-1.5% of C; 1.0% or less of Si; 1.0% or less of Mn; 3.0-5.0% of Cr; 15.0-25.0% of one or two kinds of W and Mo according to a formula (W+2Mo); 1.0-less than 1.5% of V; 5.0-10.0% of Co; and a remainder including Fe and impurities. The steel ingot of the high speed tool steel further contains 0.0005-0.004% of Ca; and 0.005-0.015% of N.

According to the present invention, by an efficient method, carbides in structures of various products that are made of the high speed tool steel can be finely formed. When the high speed tool steel is used in the blade edge of the cutting tool, excellent chipping resistance can be obtained. Therefore, the high speed tool steel that is suitable as the material for the blade edge of various cutting tools and, in particular, as the material for the blade edge of a saw blade, can be provided. A manufacturing method of the material for the blade edge can also be provided.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

A feature of the present invention is that a phenomenon that carbides are coarsened because eutectic carbides in a cast structure become massive (which is a problem in a component composition of SKH59) is inhibited by improving the component composition. The "massive eutectic carbides" mentioned in the present invention means, among eutectic carbides observed almost exclusively in plate-like (layered) shapes in an observation plane of a cast structure, those eutectic carbides for which a maximum thickness of each layer is 3 μm or more. In the following, reasons for limiting the component composition of the high speed tool steel of the present invention are described ("mass %" is simply denoted using "%").

C: 0.5-1.5%

C is an element that bonds with Cr, W, Mo and V to form carbides, increases quenching and tempering hardness, and improves wear resistance. However, when an amount of C is too high, toughness decreases. Therefore, the amount of C is set to 0.5-1.5%, balanced with the amounts of Cr, W, Mo and V (to be described later). Preferably, the amount of C is 0.9% or more and 1.2% or less.

Si: 1.0% or Less

Usually, Si is used as a deoxidizer in a melting process. However, when the amount of Si is too high, toughness decreases. Therefore, the amount of Si is set to 1.0% or less. Preferably, the amount of Si is 0.1% or more and 0.6% or less.

Mn: 1.0% or Less

Similar to Si, Mn is used as a deoxidizer. However, when the amount of Mn is too high, toughness decreases. Therefore, the amount of Mn is set to 1.0% or less. Preferably, the amount of Mn is 0.1% or more and 0.5% or less.

Cr: 3.0-5.0%

Cr is an element that is effective in imparting hardenability, wear resistance, oxidation resistance and the like. However, when the amount of Cr is too high, toughness, high-temperature strength and temper softening resistance are reduced. Therefore, the amount of Cr is set to 3.0-5.0%. Preferably, the amount of Cr is 3.5% or more and 4.5% or less.

One or Two Kinds of W and Mo According to a Formula (W+2Mo): 15.0-25.0%

W and Mo bond with C to form special carbides and impart wear resistance and adhesive wear resistance. Further, W and Mo have a large secondary hardening effect during tempering and enhance high-temperature strength. However, when the amount of W and Mo is too high, hot workability is inhibited. Therefore, the amount of one or two kinds of W and Mo according to the formula (W+2Mo) is set to 15.0-25.0%. Preferably, the amount of the one or two kinds of W and Mo according to the formula (W+2Mo) is 18.0% or more and 23.0% or less.

V: 1.0-Less than 1.5%

V bonds with C to form hard carbides and contributes to improvement in wear resistance. However, when the amount of V is too high, toughness decreases. Therefore, the amount of V is set to 1.0-less than 1.5%. Preferably, the amount of V is 1.1% or more and 1.3% or less.

Co: 5.0-10.0%

Co is solid-soluble in matrix, improves hardness of tempered martensite, and contributes to improvement in wear resistance. Further, Co improves strength and heat resistance of a product. However, when the amount of Co is too high, toughness decreases. Therefore, the amount of Co is set to 5.0-10.0%. Preferably, the amount of Co is 6.0% or more and 9.3% or less.

Further, it is important to the high speed tool steel of the present invention that suitably adjusted amounts of Ca and N be contained in the high speed tool steel of the component composition corresponding to SKH59, described above.

Ca: 0.0005-0.004%

Ca significantly affects the form of eutectic carbides in a cast structure. Therefore, Ca is an element for which management of lower and upper limits is important to the present invention. First, eutectic carbides formed during solidification contain V as a major element, so it is presumed that, in an actual operation in which a solidification rate is slow, the amount of V in a liquid phase tends to decrease at a eutectic threshold. The inventor presumes that, as a result, the number of nuclei for creating eutectic carbides decreases (distribution of the nuclei becomes sparse) so that eutectic carbides grow into massive carbides so as to fill spacings between the nuclei. Therefore, when Ca is added thereto, the amount of V in the liquid phase increases and the number of nuclei for creating eutectic carbides increases (spacings between the carbides narrow), and in fact it has been found that the eutectic carbides are inhibited from growing into massive carbides. Further, a result is obtained that when an additive amount of Ca reaches around 0.001%, the above effect is dramatically improved.

On the other hand, the inventor has found a phenomenon that, when the additive amount of Ca exceeds around 0.003%, the number of massive carbides tends to increase. It is possible that this is because the amount of V in the above liquid phase is now decreased. When the additive amount of Ca reaches 0.01%, as compared to when the additive amount of Ca is 0.001%, the effect of inhibiting the eutectic carbides from growing into massive carbides is greatly reduced. When the eutectic carbides become extremely large, they become carbides that cannot be changed into granular carbides even in a subsequent hot working process and are retained, and toughness of a product is reduced. Based on the above results, it is important that the amount of Ca in the present invention is set to 0.0005-0.004%. Preferably, the amount of Ca is 0.001% or more and 0.003% or less.

N: 0.005-0.015%

As an element that also significantly affects the form of eutectic carbides in the cast structure, N is an element for which management of lower and upper limits is important. A high speed tool steel usually inevitably contains about 0.03% of N. An excessive amount of N forms vanadium nitrides in a source material, for example, and inhibits hot workability of the source material. Therefore, it is proposed to reduce the amount of N from the above amount of about 0.03%. However, the inventor has found that, even when the amount of N is reduced, when the amount of N is reduced too much, the above effect due to adding Ca is greatly inhibited and it significantly promotes the eutectic carbides growing into massive carbides. The inventor has also found that this inhibitory effect is also significant when, conversely, the amount of N is high. Therefore, there is an optimum range for the amount of N according to the present invention. It is confirmed that the optimum range is around 0.01%. Therefore, it is important that the amount of N in the present invention is set to 0.005-0.015%. The lower limit is preferably 0.007% or more, and more preferably 0.009% or more. The upper limit is preferably 0.013% or less, and more preferably 0.012% or less.

In addition, the high speed tool steel of the present invention can contain S and P as inevitable impurity elements. When the amount of S is too high, in addition to S itself inhibiting hot workability, S bonds with the above Ca, inhibiting the effect of adding Ca in the present invention. Therefore, it is preferable that the amount of S is restricted to 0.01% or less. It is more preferable that the amount of S is 0.005% or less. When the amount of P is too high, toughness decreases. Therefore, it is preferable that the amount of P is restricted to 0.05% or less. It is more preferable that the amount of P is 0.025% or less.

By casting the high speed tool steel of the present invention as a steel ingot and subjecting the steel ingot to hot working, a material for a blade edge can be obtained in which carbides in a post-hot working annealed structure of the material for the blade edge have small sizes. Preferably, an absolute maximum length of the carbides contained in a cross-sectional structure of the material for the blade edge is less than 25 μm. Next, a cutting tool, manufactured by welding the material for the blade edge to a body material and subjecting a resulting product to sharpening, then quenching and tempering, has a decreased number of coarse carbides in a blade edge structure of the cutting tool and has excellent chipping resistance.

First Embodiment

A molten steel adjusted to a predetermined component composition is prepared. The amount of N in the molten steel is adjusted by vacuum refining and introducing a CrN alloy. The amount of Ca in the molten steel is adjusted by introducing a Ca—Si alloy. Next, the molten steel is cast at a cooling rate of about 10° C./minute, which corresponds to an actual operation level, to fabricate a steel ingot of a high speed tool steel having a component composition as illustrated in Table 1.

TABLE 1

| Steel Ingot No. | Component Composition (mass %) * [Ca] and [N] (ppm) | | | | | | | | | | | | Remarks |
|---|---|---|---|---|---|---|---|---|---|---|---|---|---|
| | C | Si | Mn | P | S | Cr | W | Mo | V | Co | [Ca] | [N] | |
| 1 | 1.08 | 0.31 | 0.28 | 0.019 | 0.0019 | 3.81 | 1.41 | 9.36 | 1.10 | 7.90 | 11 | 59 | Examples of |
| 2 | 1.08 | 0.33 | 0.29 | 0.024 | 0.0015 | 3.81 | 1.38 | 9.41 | 1.09 | 7.94 | 9 | 108 | Present |
| 3 | 1.08 | 0.31 | 0.29 | 0.023 | 0.0015 | 3.82 | 1.39 | 9.32 | 1.13 | 7.84 | 9 | 125 | Invention |
| 4 | 1.07 | 0.32 | 0.30 | 0.024 | 0.0013 | 3.80 | 1.41 | 9.31 | 1.11 | 7.90 | 29 | 60 | |
| 5 | 1.06 | 0.31 | 0.29 | 0.020 | 0.0016 | 3.79 | 1.41 | 9.33 | 1.11 | 7.90 | 29 | 103 | |
| 6 | 1.08 | 0.32 | 0.30 | 0.023 | 0.0015 | 3.80 | 1.42 | 9.38 | 1.13 | 7.87 | 24 | 125 | |

TABLE 1-continued

| Steel Ingot No. | Component Composition (mass %) * [Ca] and [N] (ppm) | | | | | | | | | | | |
|---|---|---|---|---|---|---|---|---|---|---|---|---|
| | C | Si | Mn | P | S | Cr | W | Mo | V | Co | [Ca] | [N] | Remarks |
| 7 | 1.07 | 0.33 | 0.30 | 0.023 | 0.0018 | 3.86 | 1.40 | 9.35 | 1.10 | 7.89 | <5 | 62 | Comparative |
| 8 | 1.08 | 0.32 | 0.29 | 0.024 | 0.0015 | 3.80 | 1.40 | 9.31 | 1.11 | 7.83 | <5 | 97 | Examples |
| 9 | 1.06 | 0.29 | 0.26 | 0.008 | 0.0021 | 3.89 | 1.38 | 9.47 | 1.14 | 7.87 | <5 | 165 | |
| 10 | 1.08 | 0.35 | 0.29 | 0.024 | 0.0021 | 3.85 | 1.41 | 9.29 | 1.14 | 7.83 | 45 | 103 | |
| 11 | 1.08 | 0.35 | 0.29 | 0.024 | 0.0021 | 3.86 | 1.46 | 9.36 | 1.15 | 7.80 | 46 | 169 | |
| 12 | 1.08 | 0.35 | 0.29 | 0.020 | 0.0020 | 3.83 | 1.38 | 9.34 | 1.13 | 7.78 | 11 | 45 | |
| 13 | 1.07 | 0.33 | 0.29 | 0.021 | 0.0021 | 3.96 | 1.41 | 9.31 | 1.12 | 7.80 | 20 | 196 | |

* Steel ingots No. 7-9 no Ca added

Distributions of plate-like eutectic carbides in structures of these steel ingots are observed using an optical microscope with a magnification of 500 times. A position of the steel ingot where eutectic carbides are observed is at H/10 from a top of the steel ingot with respect to a height H of the steel ingot and D/8 with respect to a diameter D (that is, a position that is at D/8 from an outer periphery). An observation surface is subjected to mirror polishing and thereafter is corroded with a Murakami reagent, which corrodes and dyes the eutectic carbides. Optical micrographs of steel ingots No. 1-No. 3 of examples of the present invention and a steel ingot No. 9 of a comparative example are respectively illustrated in FIGS. 1-4. In each figure, black portions formed almost exclusively in plate-like (layered) shapes are eutectic carbides.

Further, an area in a structure occupied by, among the above eutectic carbides, those massive eutectic carbides for which a maximum thickness of each layer is 3 μm or more is measured. Quantitative determination of the area is performed using an image processing software imageJ (http://imageJ.nih.gov/ij/) provided by the United States National Institutes of Health (NIH) and boneJ (http://boneJ.org/) that is an add-on software of imageJ and allows a local thickness of a massive carbide to be analyzed. A total area of the observation plane is about 327000 μm² (specifically, 326890.3 μm²). The results are illustrated in Table 2.

TABLE 2

| Steel Ingot No. | Massive Eutectic Carbides | | Remarks |
|---|---|---|---|
| | Area (μm²) | Area Rate (%) | |
| 1 | 1119 | 0.34 | Examples of Present Invention |
| 2 | 786 | 0.24 | |
| 3 | 1428 | 0.44 | |
| 4 | 1997 | 0.61 | |
| 5 | 1425 | 0.44 | |
| 6 | 1796 | 0.55 | |
| 7 | 2297 | 0.70 | Comparative Examples |
| 8 | 1655 | 0.51 | |
| 9 | 2369 | 0.72 | |
| 10 | 2710 | 0.83 | |
| 11 | 2770 | 0.85 | |
| 12 | 2320 | 0.71 | |
| 13 | 2810 | 0.86 | |

Figure 1:
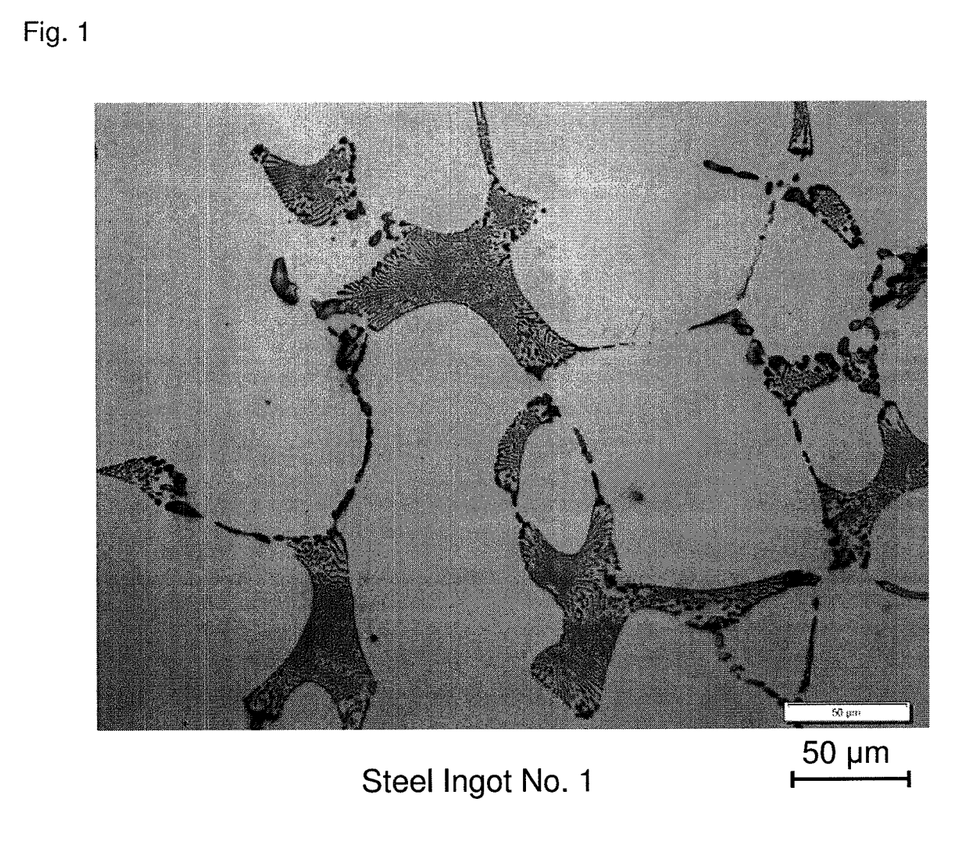
FIG. 1 is a micrograph illustrating an example of eutectic carbides distributed in a cast structure of a high speed tool steel according to an example of the present invention.
Figure 2:
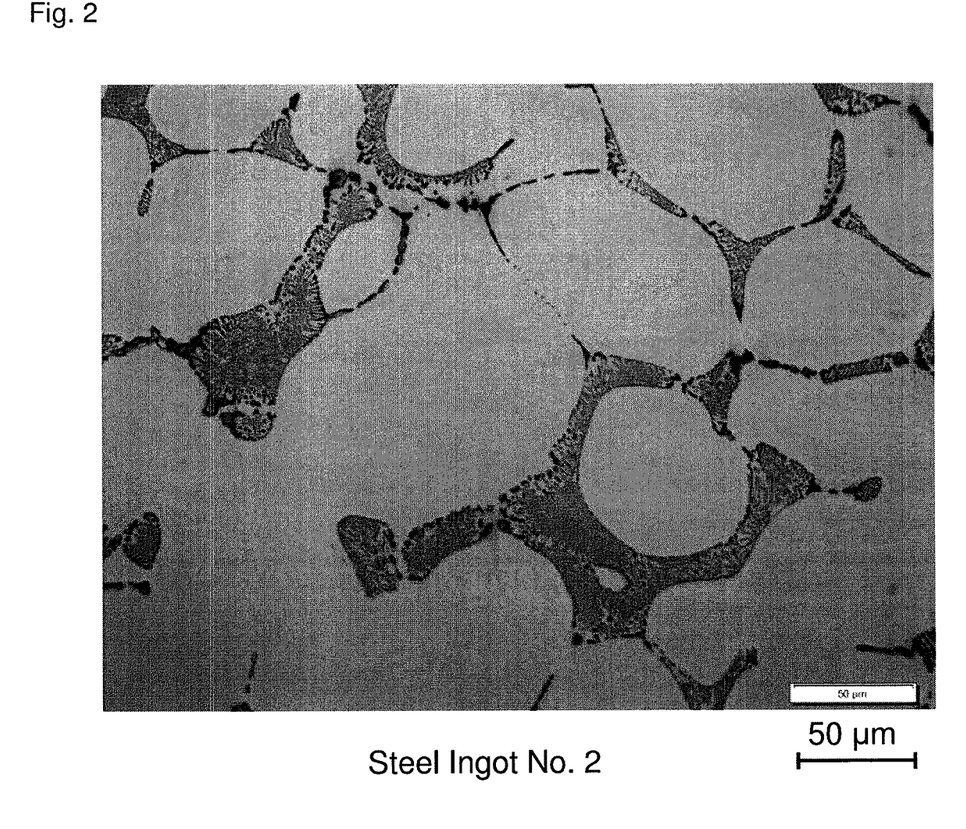
FIG. 2 is a micrograph illustrating an example of eutectic carbides distributed in a cast structure of a high speed tool steel according to an example of the present invention.
Figure 3:
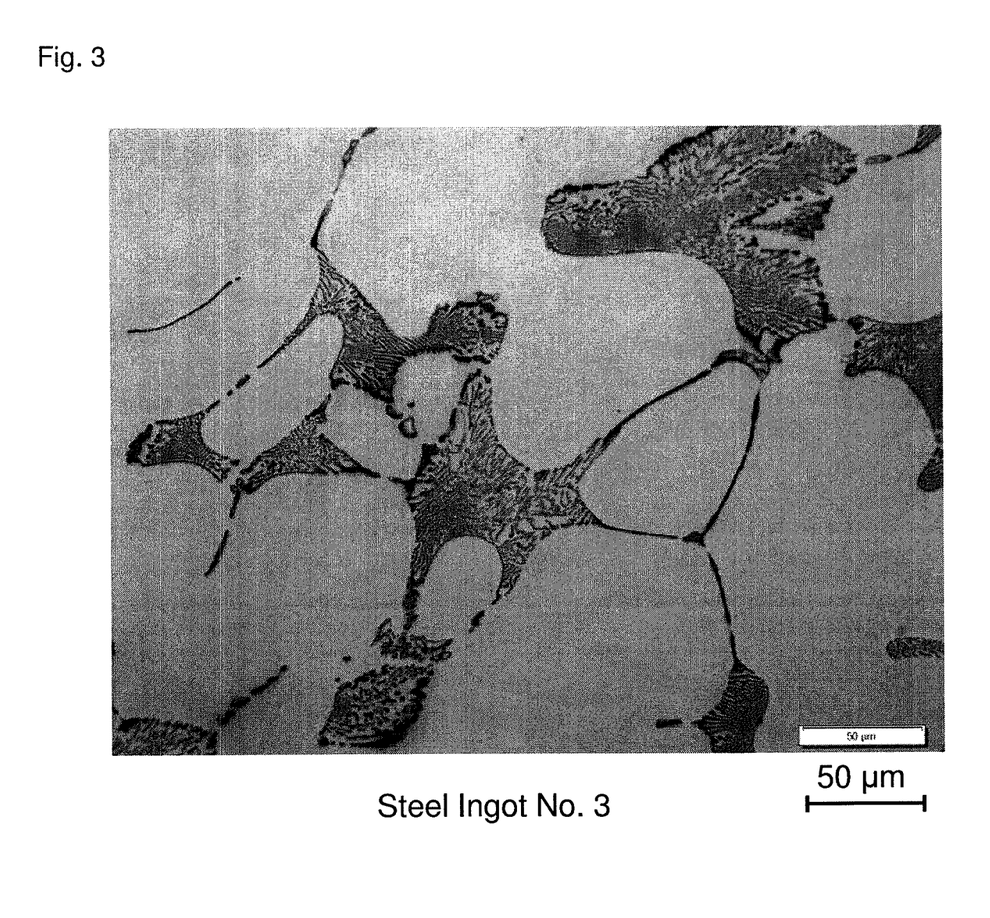
FIG. 3 is a micrograph illustrating an example of eutectic carbides distributed in a cast structure of a high speed tool steel according to an example of the present invention.
Figure 4:
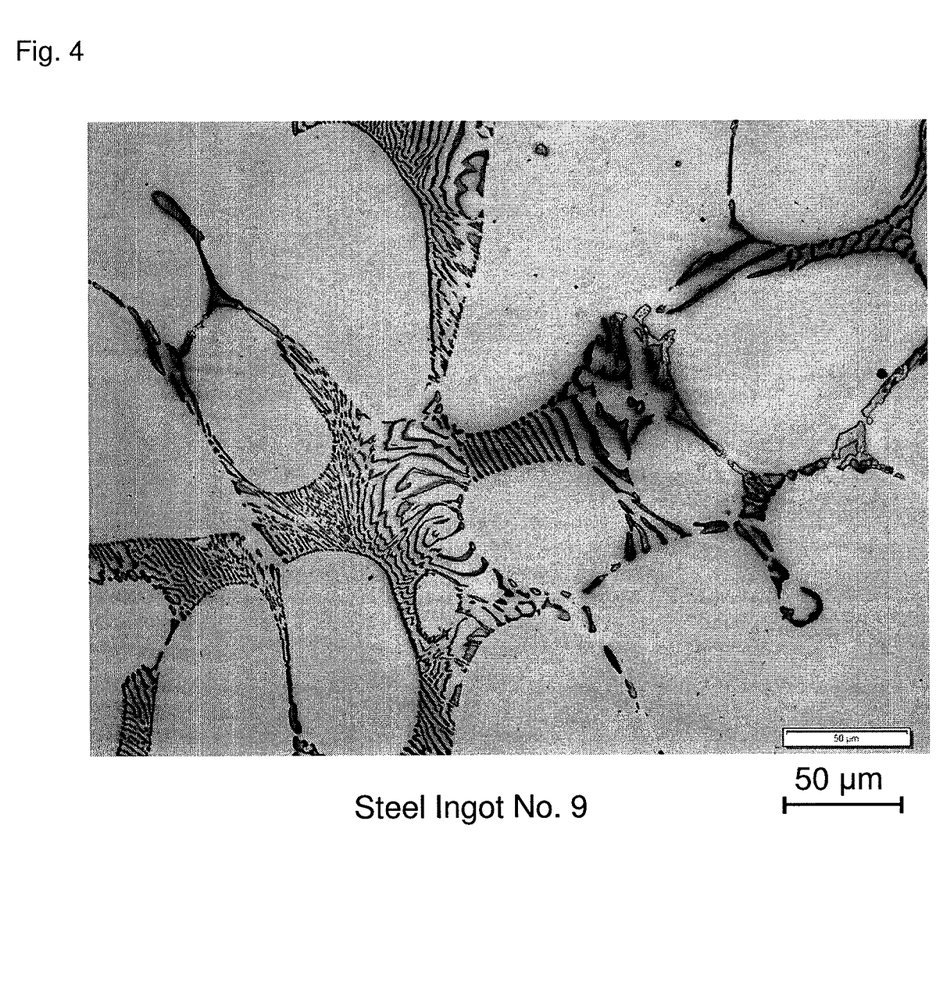
FIG. 4 is a micrograph illustrating an example of eutectic carbides distributed in a cast structure of a high speed tool steel according to a comparative example.

As illustrated in FIGS. 1-3, for the high speed tool steels of the examples of the present invention, the thickness of each layer of eutectic carbides in the cast structure is thin and the eutectic carbides are overall finely formed. In contrast, as illustrated in FIG. 4, for the conventional high speed tool steel (No. 9), the thickness of each layer of eutectic carbides in the cast structure is thick and a large number of massive eutectic carbides having a maximum thickness of 3 μm or more are formed. Among these massive eutectic carbides, many have a maximum thickness of 7 μm or more. Further, from the results of Table 2, the areas occupied by massive eutectic carbides for which a maximum thickness is 3 μm or more in the high speed tool steels of the examples of the present invention are about 0.6 area % or less relative to the total areas of the observation planes, and are less than that of the conventional high speed tool steel (No. 9).

Figure 5:
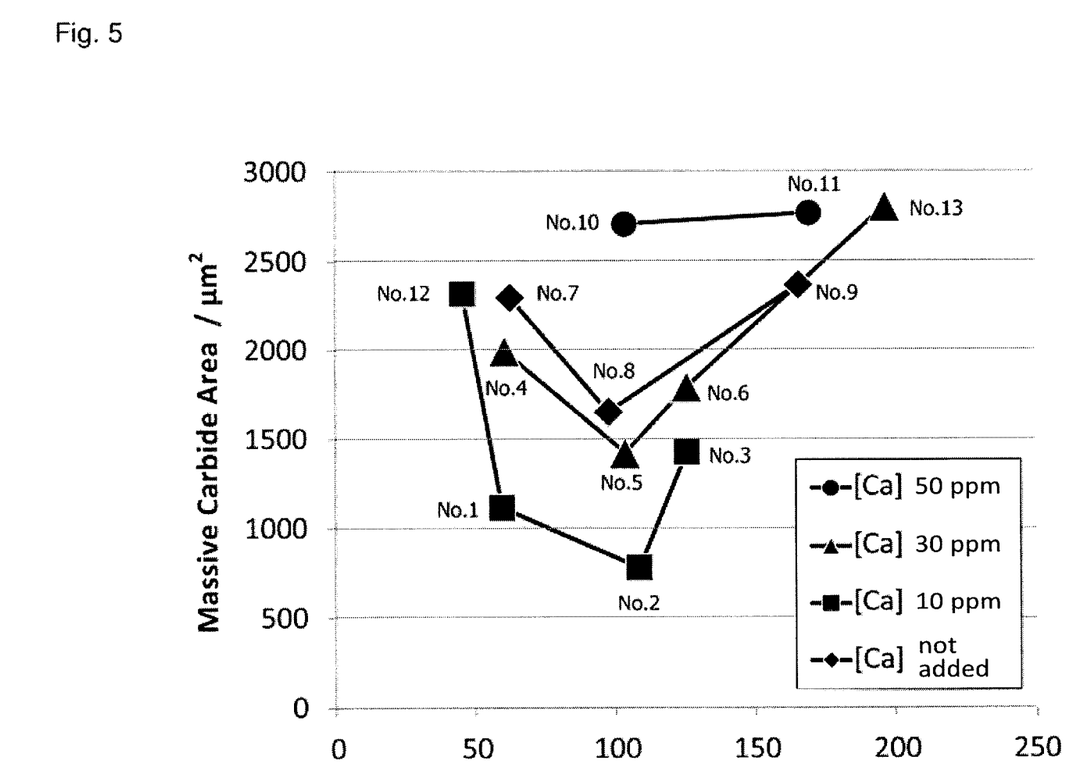
FIG. 5 is a diagram explaining a relationship between amounts of Ca and N that are contained in a steel ingot of a high speed tool steel and amount of massive eutectic carbides.

FIG. 5 illustrates measurement results of the areas of the massive eutectic carbides in the high speed tool steels Nos. 1-13 of the examples of the present invention and the comparative examples, organized in relation to the amount of Ca and amount of N. It appears that, in a high speed tool steel (No. 8) having the amount of N adjusted to near 100 ppm (0.01%), even without adding Ca, formation of massive eutectic carbides is inhibited. However, with respect to the above thickness of 3 μm or more that is used as an indicator of a massive eutectic carbide, the thickness of each layer of the eutectic carbides in the high speed tool steel No. 8 is as thick as that of the high speed tool steel No. 9 (FIG. 4). It is clear that, as compared to the high speed tool steel No. 8, in the high speed tool steels (Nos. 2 and 5) of the examples of the present invention in which the amount of N is adjusted to near 100 ppm (0.01%) and, in addition, Ca is added in the amount set in the present invention, formation of massive eutectic carbides is inhibited, the thickness of each layer of the eutectic carbides is thin, and the effect that the eutectic carbides are overall finely formed is significant. Further, it is clear that, when the amount of Ca exceeds the amount set in the present invention, massive eutectic carbides tend to increase in number.

Second Embodiment

Assuming a case where the high speed tool steel of the present invention is used as a blade edge of a cutting tool, in order to evaluate the chipping resistance in this case, a bending test of three-point bending is performed. A bending test specimen is prepared in the following manner. First, a molten steel adjusted to a predetermined component composition is prepared. The amount of N in the molten steel is adjusted by degassing refinement. The amount of Ca in the molten steel is adjusted by introducing a Ca—Si alloy. Next, the molten steel is cast at a cooling rate of about 10° C./minute, which corresponds to an actual operation level, to fabricate a steel ingot of a high speed tool steel having a component composition as illustrated in Table 3. For these steel ingots, distributions of eutectic carbides in structures of the steel ingots No. 14 and No. 15 are, respectively, substantially equal to those of the steel ingots No. 2 and No. 9 of the first embodiment.

TABLE 3

| Steel Ingot No. | C | Si | Mn | P | S | Cr | W | Mo | V | Co | [Ca] | [N] | Remarks |
|---|---|---|---|---|---|---|---|---|---|---|---|---|---|
| 14 | 1.08 | 0.29 | 0.28 | 0.024 | 0.0012 | 3.92 | 1.46 | 9.49 | 1.17 | 7.87 | 11 | 74 | Example of Present Invention |
| 15 | 1.06 | 0.31 | 0.29 | 0.018 | 0.0004 | 3.96 | 1.40 | 9.41 | 1.16 | 7.83 | <5 | 160 | Comparative Example |

\* Steel ingot No. 15 no Ca added

Figure 6:
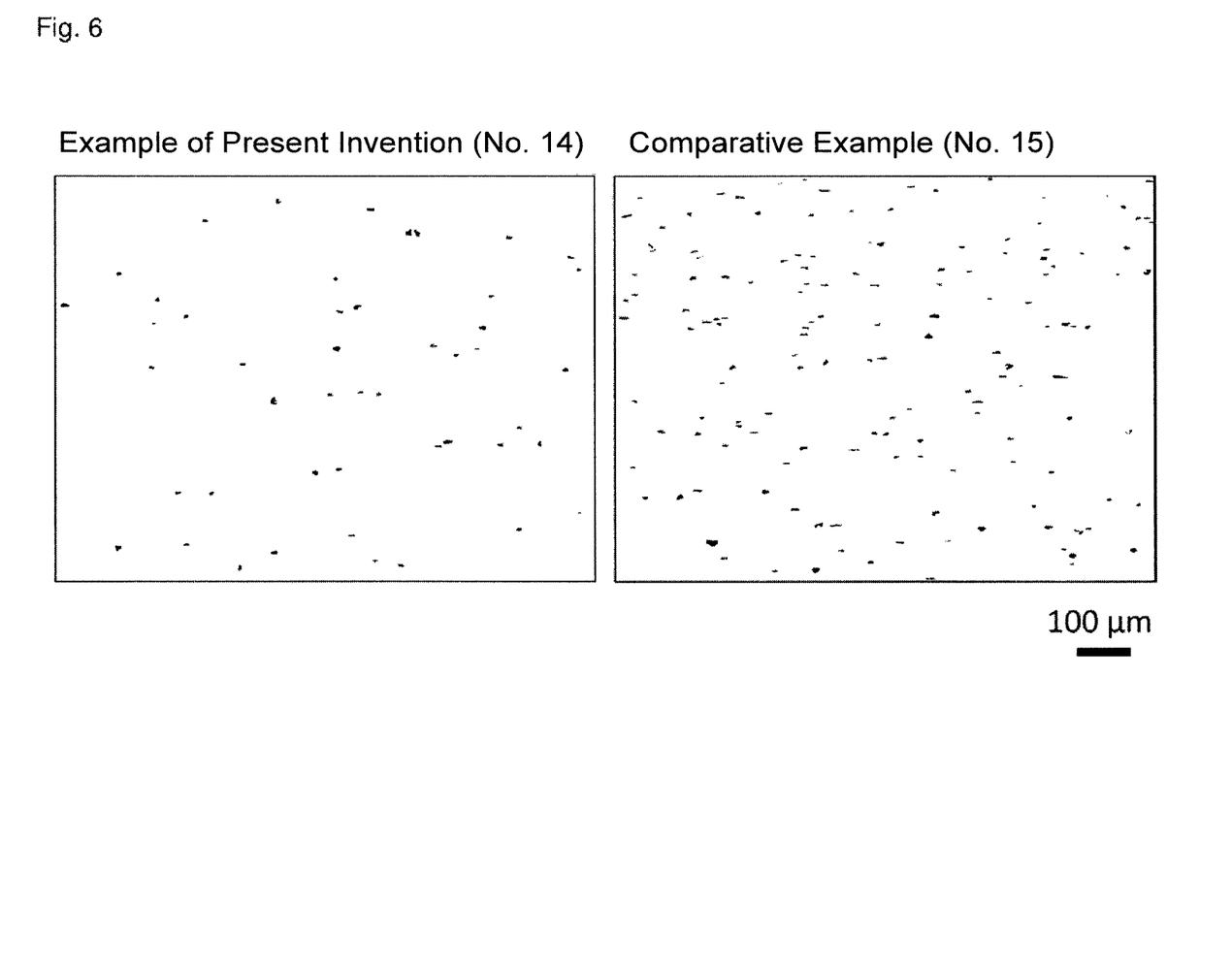
FIG. 6 illustrates images obtained by binarizing cross sections of annealed structures of high speed tool steels of an example of the present invention and a comparative example that are observed using a scanning electron microscope; the images are drawing substitute photographs illustrating coarse carbides distributed in the cross sections of the annealed structures.

Next, the above steel ingot is subjected to hot working and a material for a blade edge is obtained in a form of a coil wire rod in an annealed state having a diameter of 5 mm. At this point, distribution of carbides in the annealed structure of the coil wire rod is observed. A scanning electron microscope with magnification of 150 times is used in the observation. With respect to a cross section in a length direction of the coil wire rod (longitudinal cross section), a field of view of about 546000 $\mu m^2$ (specifically, 546133 $\mu m^2$) is observed and a number of carbides having an absolute maximum length of 10 $\mu m$ or more is measured. The measurement of the number of carbides is performed in the following manner. First, with respect to a backscattered electron image obtained using the scanning electron microscope, by performing binarization processing according to the amounts of mainly C, W, Mo and V when coarse carbides form almost exclusively, a binary image that illustrates coarse carbides distributed in a cross-sectional structure is obtained. FIG. 6 illustrates binary images of No. 14, which is an example of the present invention, and No. 15, which is a comparative example (carbides are indicated by a distribution of black dots). Carbides having an absolute maximum length of 10 $\mu m$ or more are extracted from the binary images and the number of carbides is measured. The results of the measurement are illustrated in Table 4.

TABLE 4

| | Number of Carbides | | | | | |
|---|---|---|---|---|---|---|
| Steel Ingot No. | 10 $\mu m$ or more and 15 $\mu m$ or less | 15 $\mu m$ or more and 20 $\mu m$ or less | 20 $\mu m$ or more and 25 $\mu m$ or less | 25 $\mu m$ or more and 30 $\mu m$ or less | 30 $\mu m$ or more and 35 $\mu m$ or less | Remarks |
| 14 | 229 | 11 | 3 | 0 | 0 | Example of Present Invention |
| 15 | 374 | 76 | 13 | 4 | 2 | Comparative Example |

Assuming the above coil wire rod in the annealed state is subjected to quenching and tempering under a condition that the coil wire rod is used for an actual blade edge, quenching is performed from an austenitizing temperature of 1190° C. and a tempering heat treatment is performed in which holding for one hour at 560° C. is performed three times. A post-heat treatment test specimen is subjected to a bending test of three-point bending. A size of the test specimen for the bending test is 4 mm (diameter)×60 mm (length). A span during the test is 50 mm. A maximum bending stress until the test specimen breaks (that is, transverse rupture strength), is measured. The results are illustrated in Table 5.

TABLE 5

| Steel Ingot No. | Hardness (HRC) | Bending Strength (N/mm$^2$) | Remarks |
|---|---|---|---|
| 14 | 68.6 | 3988 | Example of Present Invention |
| 15 | 68.8 | 3617 | Comparative Example |

For the high speed tool steels of the examples of the present invention, there are few coarse carbides in the annealed structure before quenching and tempering, and carbides having an absolute maximum length of 25 $\mu m$ or more are not confirmed in the cross-sectional structure. Further, the high speed tool steels of the examples of the present invention, in a state of a product after quenching and tempering, show a high transverse rupture strength. In contrast, for the high speed tool steels of the comparative examples, it appears that coarse carbides distributed in the annealed structure remain also in the structure after quenching and tempering, and the transverse rupture strength is lower than that of the examples of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A high speed tool steel comprising, by mass percent:
0.5-1.5% of C;
1.0% or less of Si;
1.0% or less of Mn;
3.0-5.0% of Cr;
15.0-25.0% of one or two kinds of W and Mo according to a formula (W+2Mo);
1.0-less than 1.5% of V;
5.0-10.0% of Co; and
a remainder including Fe and impurities,
the high speed tool steel further containing:
0.0005-0.004% of Ca; and
0.005-0.015% of N.

2. A material for a blade edge that is made of the high speed tool steel according to claim 1.

3. The material for the blade edge according to claim 2, wherein an absolute maximum length of a carbide contained in a cross-sectional structure is less than 25 μm.

4. A cutting tool made by welding the material for the blade edge according to claim 3 to a body material.

5. A cutting tool made by welding the material for the blade edge according to claim 2 to a body material.

6. A manufacturing method of a material for a blade edge, comprising:
casting a high speed tool steel as a steel ingot; and
hot working the steel ingot,
the high speed tool steel comprising, by mass percent:
0.5-1.5% of C;
1.0% or less of Si;
1.0% or less of Mn;
3.0-5.0% of Cr;
15.0-25.0% of one or two kinds of W and Mo according to a formula (W+2Mo);
1.0-less than 1.5% of V;
5.0-10.0% of Co; and
a remainder including Fe and impurities,
the steel ingot of the high speed tool steel further containing:
0.0005-0.004% of Ca; and
0.005-0.015% of N.

* * * * *